Feb. 7, 1950 E. VASSY 2,496,967
AUTOMATIC RECORDING MICROPHOTOMETER
Filed Feb. 25, 1948 5 Sheets-Sheet 1

Inventor:
E. Vassy

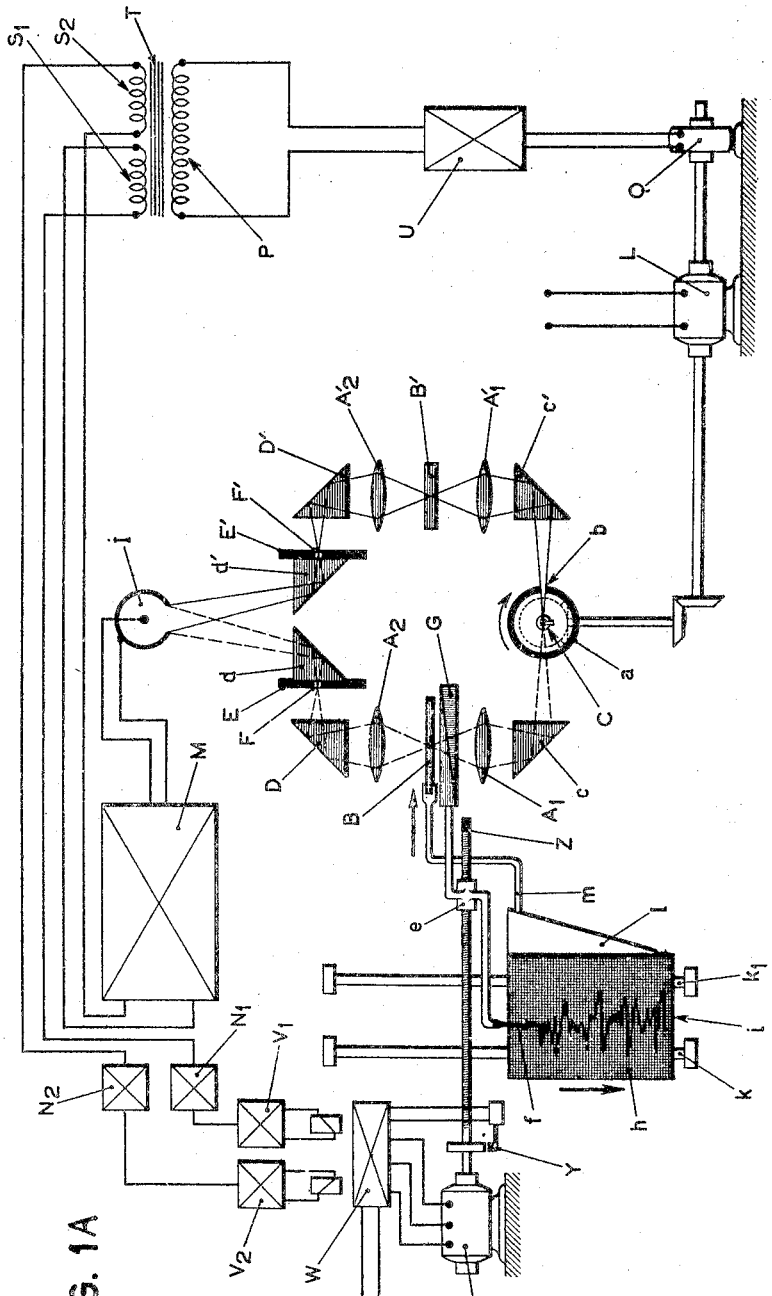

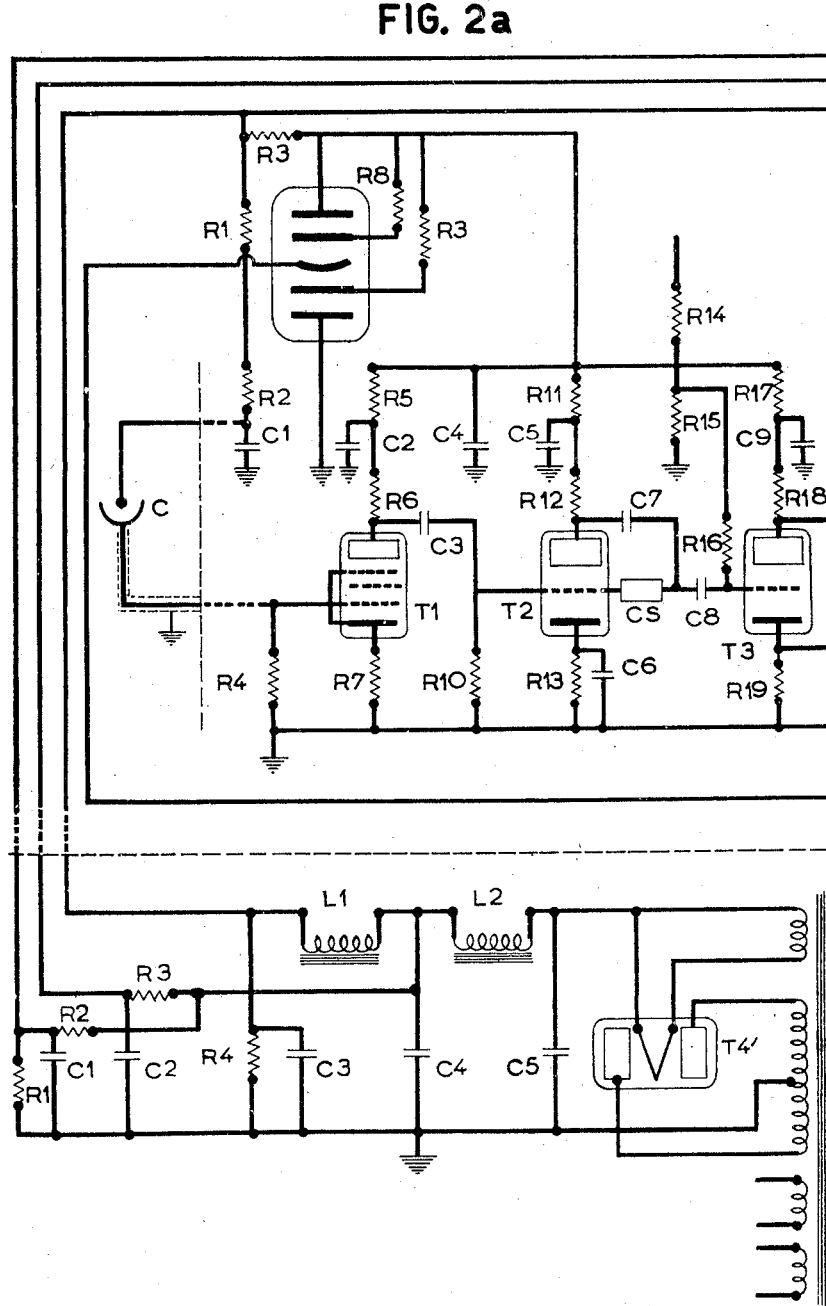

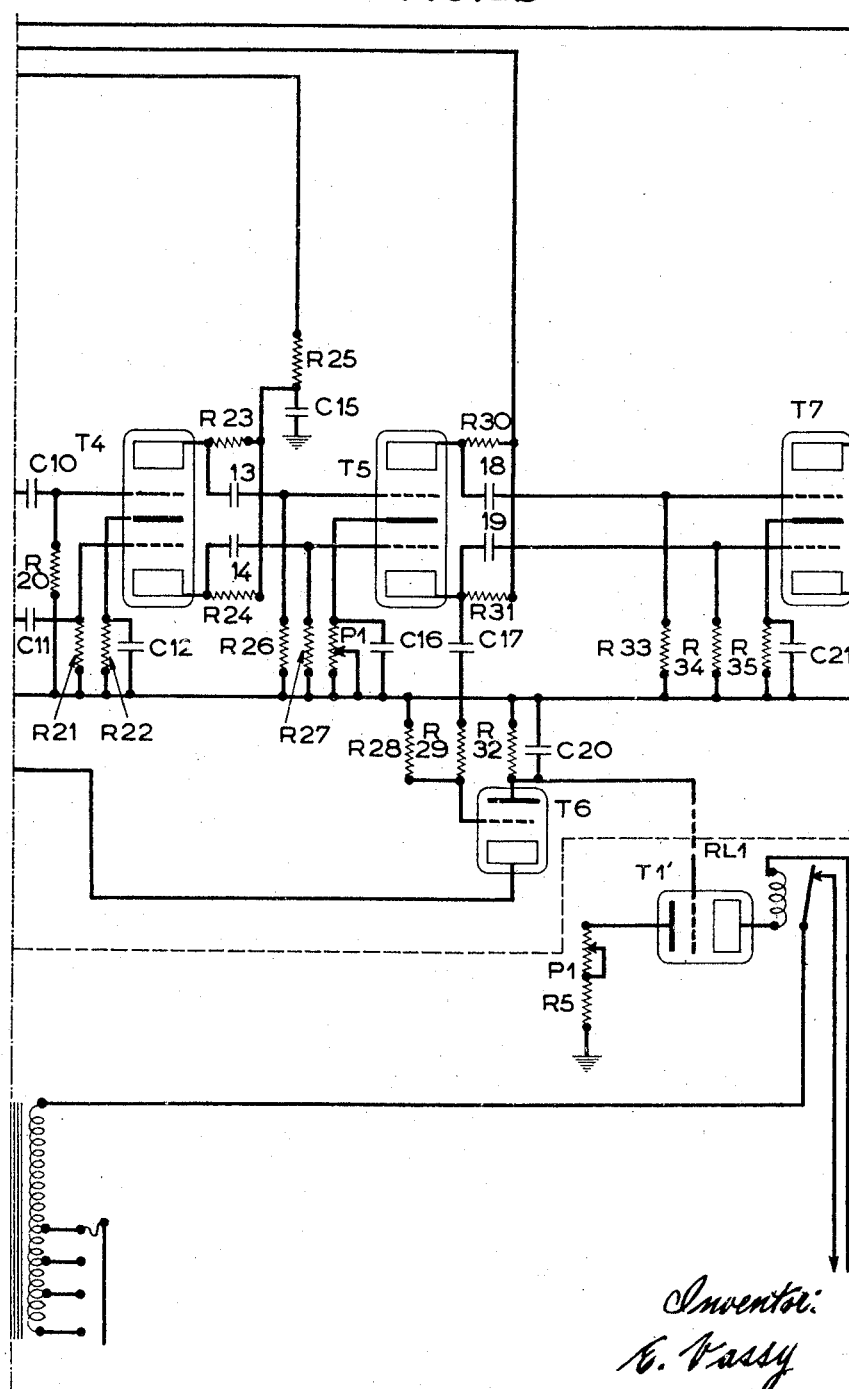

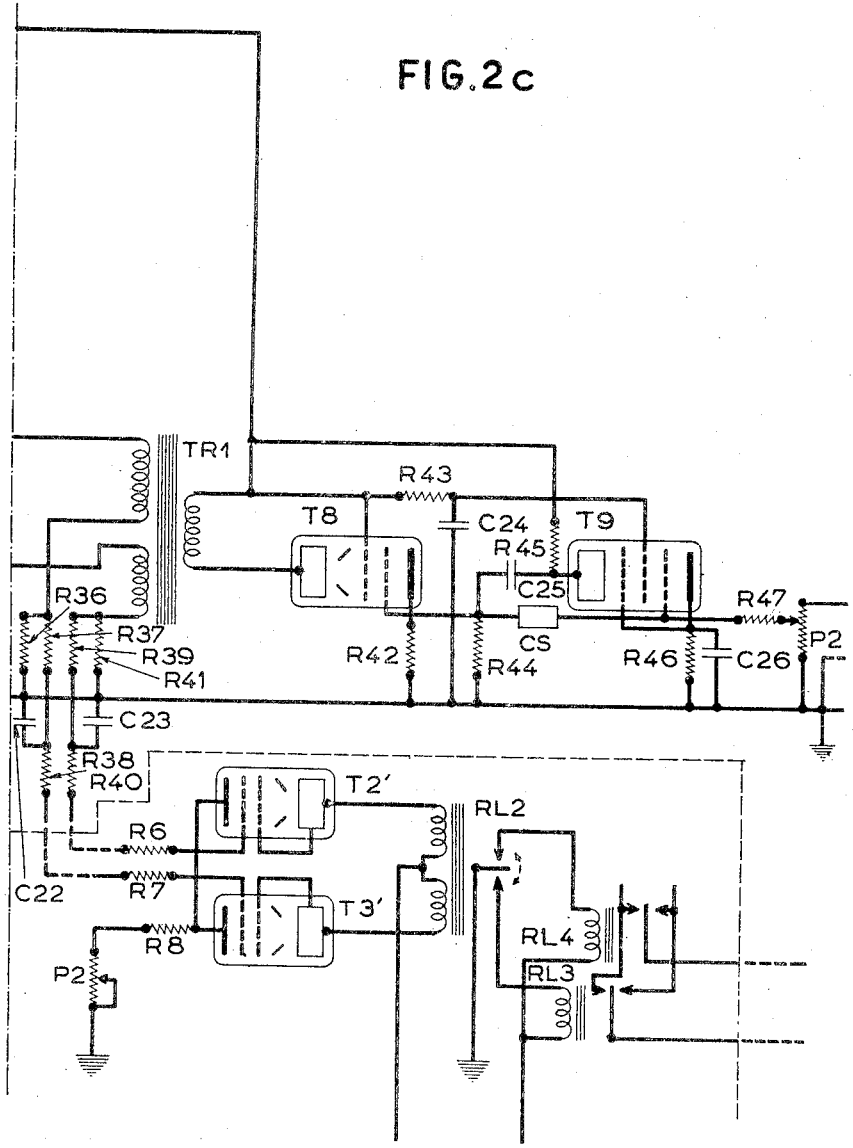

Patented Feb. 7, 1950

2,496,967

UNITED STATES PATENT OFFICE 2,496,967

AUTOMATIC RECORDING MICROPHOTOMETER

Etienne Vassy, Paris, France

Application February 25, 1948, Serial No. 10,865
In France June 6, 1947

7 Claims. (Cl. 250—204)

In my copending application Serial No. 6,315, filed February 4, 1948, I have described an automatic recording microphotometer using a light beam emitted by a single source of light and alternately passing along two different paths, namely on the one hand through a reference element having a predetermined optical density, and on the other hand through an area to be measured and associated with a photometric wedge of progressively varying optical density, said beam further being caused to strike the cathode of a photoelectric cell feeding a single-path amplifier provided with two output paths. In said copending application, means are disclosed for automatically shifting the photometric wedge in response to the intensity of light issuing therefrom and from the scanned area at a given instant, in such a way that said light intensity be kept equal to the light intensity beyond said reference element, and for simultaneously recording the displacement of said wedge, thereby recording the optical density of the area being measured. More specifically, the fixed light source is arranged along the axis of an opaque rotating cylinder having a window therein for alternately projecting the light beam along said different paths, an electronic arrangement is used for alternately blocking that output path from said single-path amplifier which is not used at a given moment and means are provided for displacing a recording point in accordance with the displacements of said photometric wedge for recording said displacements onto a receiving sheet carried by a carriage which is caused to be displaced in straight line at a constant speed in a direction perpendicular to the direction of displacement of said photometric wedge. Further, a mechanical arrangement is used for imparting to the area to be measured such a displacement that any elemental area thereof is successively scanned by said light beam.

An object of my present invention is to provide improvements to the automatic recording microphotometer disclosed in my copending application above referred to, in order to improve the operation thereof.

Another object of my invention is to provide means for improving the optical efficiency of said automatic registering microphotometer.

A further object of my invention is to provide means for considerably improving the signal-to-noise ratio in the amplifier associated with the microphotometer.

Yet another object of my invention is to provide means for making it possible to record considerable optical density variations over small areas, by conveniently controlling the displacement of the supporting carriage supporting the area to be measured.

The invention will be clearly understood from a reference to the accompanying drawing, wherein:

Fig. 1A is a block diagram schematically showing the automatic recording microphotometer disclosed in my copending application;

Figure 3:
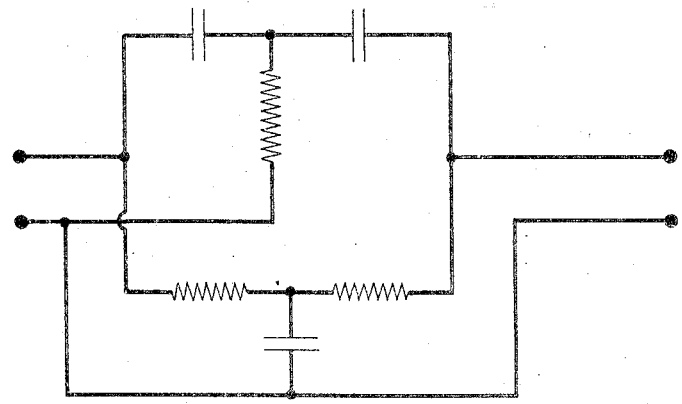

Figs. 2a, 2b and 2c when arranged end to end form a complete wiring diagram of the improved amplifier with the selective devices based on the principle of counter feed-back operation; and Fig. 3 diagrammatically illustrates one example of a counter feed-back network constituting a high selectivity, resistance-capacitance network.

Referring first to Fig. 1A, the automatic registering microphotometer of my copending application comprises a light source C arranged axially into a rotating cylinder $a$ formed with a window $b$ whereby a beam of light may be alternately projected onto two reflection prisms $c$ and $c'$ displaced 180° with respect to each other. B' indicates a reference member comprising an area of suitable optical density on which the lens A'1 is adapted to form an image of the light source or lamp C. An identical lens A'2 picks up the image of the filament on the reference element B' and projects it onto an adjustable slot F' in a screen E' through the medium of a reflection prism D'. From this slot F' the beam of light is sent onto the cathode of a photoelectric cell I through the medium of a reflection prism $d'$.

The other path for the light beam includes a lens $A_1$ which forms an image of the filament of the lamp C through a photometer wedge G upon the photographic emulsion B, the density of which is to be measured. The image of the filament on the emulsion B is then taken up by a symmetrical lens $A_2$ to be projected on an adjustable slot F in a screen E through the agency of a reflection prism D. The beam is then directed onto the cathode of the above-mentioned photoelectric cell I through the medium of a prism $d$.

The photocell I controls a single path amplifier M adapted to feed two output amplifiers $N_1$ and $N_2$ which in turn control the actuating devices $V_1$ and $V_2$ of the relay box W of an electric motor X provided with a brake Y likewise controlled from the box W.

The motor X drives a threaded shaft Z for controlling the displacement of a carriage or slide-block e. The slide-block e is mechanically connected with the photometer wedge G and carries a recording arm f adapted to produce a record on a sheet h mounted on a carriage i which can be moved at a constant speed along two guides k and k₁ transversally to the direction of displacement of the slide-block e. One edge of the carriage i carries an adjustable camming surface l adapted to cooperate with the end of a pusher arm m the other end of which is physically connected with a support member carrying the emulsion B the density of which is to be measured.

A conventional electronic blocking means, including a twin-triode tube for instance, and controlled from the motor L which drives the obturating cylinder a, insures a synchronized operation between, on the one hand, the striking of the beam light issuing from the source C alternately on the reference element B' and on the assembly comprising the emulsion B and the photometer wedge G, and, on the other hand, the blocking off of either one or the other of the paths provided for the output of the amplifier M.

It may be seen that whenever the cylinder a has effected a complete revolution, a single light signal will have occurred through each of the above described optical paths, and that, as a result, the light flux issuing from the light source C is relatively ineffectively used.

According to my present invention, I use a specially designed rotary cylinder including a plurality of conveniently arranged windows or slots to improve the optical efficiency of my microphotometer.

According to another feature, in the amplifier M, I use a selective circuit arrangement including negative feedback (or counter-feedback) networks to substantially suppress the ground noise as a result of the very narrow frequency band which passes through the amplifier, whereby the signal-to-noise ratio is considerably improved.

Moreover, when recording considerable density variations in a very small area, as is the case for instance in absorption spectra, variable density sound-tracks and the like, it is necessary to sufficiently slow down the movement of the carriage supporting the area to be measured so that the recording or indicating device will have time to reach its maximum displacement although certain parts of the apparatus have a substantial inertia. For instance, if a narrow and opaque line arranged on a transparent background is to be measured, the image obtained in the record will not reach the value corresponding with the maximum capacity, because before the maximum displacement of the recording arm may have been reached the luminous scanning spot will have travelled past the opaque zone and reached the transparent background area, and the measurement will be vitiated with an error which would be particularly important for very narrow opaque lines.

According to my present invention therefore I use a relay controlled by an electronic arrangement responsive to the signal from the photocell when the amplitude of said signal exceeds a predetermined threshold value for cutting off the supply of the motor which controls the displacements of the slide-block supporting the area to be measured. The displacement of said block is therefore suppressed, and this is finally manifested as an automatic slowing down of the displacement.

Figure 1:
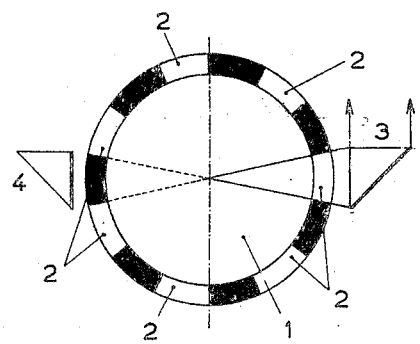
Fig. 1 is a diagrammatical cross-section of a rotary cylinder embodying my present invention.

As shown in Fig. 1, it will be understood that the number of light signals emitted in each revolution of the cylinder 1 is increased by multiplying the number of recesses 2, so that whenever one optical path is uncovered, this being the case for the path 3, the opposite optical path which includes the reflection prism 4 is completely covered, in other words there is provided an odd number of recesses of equal dimensions. As a consequence, whenever one of the paths is uncovered for instance over a portion of its surface (e. g. ⅓ thereof) the other one will be uncovered throughout a complementary portion thereof (e. g. ⅔) and it follows that at a given instant the sum total of the combined light fluxes passing through both optical paths remains constant.

The alternator shown at O in Fig. 1 and which is intended to supply the voltage required to produce the electrical blocking of (or to trigger-off) each one of the two amplifier output paths should be accordingly modified so that the switching rate or frequency therein will correspond with the traversing of the multiple slots in front of each optical path.

It will be understood moreover that it may be possible, without exceeding the scope of the invention to provide further devices or arrangements whereby a similar result may be achieved.

Thus, for instance, it may be stated merely by way of illustration and not of limitation, that one or more auxiliary photoelectric cells may be used, suitably arranged around the periphery of the rotary cylinder 1.

The improved method and device forming the subject matter of this invention will make it possible to reduce the loss of light from the light source and thereby enable larger optical densities to be measured. In another respect, the frequency of the electrical off and on switching of each transmission path will be multiplied by the number of slots as compared with the device provided in the parent patent. It follows that the electronic device may then be modified to assume the form illustrated in Figs. 2a, 2b and 2c.

The light signals striking the cell C will cause corresponding voltage variations across the terminals of the input resistance R4, said variations being amplified through a first tube T1 which may desirably comprise a pentode having a fixed inclination characteristic, for instance a tube type 6J7, then through a tube T2 which for reasons of stability may desirably comprise a triode having a large amplification factor, such as a type 6F5 tube.

A highly selective counter-feed-back device of well-known type is connected in between the grid and the plate of said last mentioned tube in such a way that the counter-feed-back will be complete for all frequencies of the spectrum used, except the tuning frequency of the filter, at which it will drop practically to zero as is well known.

In such conditions, the counter-feed-back device shown at CS between the anode and grid of the tube T2 will considerably reduce the gain for all the frequencies different from the tuning frequency, and the amplification gain will be normal only for the latter.

The tube T2 in turn feeds a triode T3 having a normal amplification factor (such as a type 6C5 tube mounted as a phase transformer) with cathode coupling, but which could comprise any other type of tube. The anode and the cathode of said tube feed in 180° phase-displaced relationship two symmetrical paths adapted to amplify the signal (tubes T4 and T5). Said tubes which desirably may be dual triodes of a type similar to the commercially available 6N7 tube, are grid-biassed in such a way that the signal will have the tops of its wave forms cut off thereby to obtain a signal approaching a square wave form and eliminating at least part of the ground noise because of the curvature of the grid voltage-anode current characteristic of the tubes used. Moreover the signal supplied by the alternator output is amplified through a tube T9 which may desirably be a type 6J7 tube or the like, and wherein a counter-feed-back grid-plate coupling is provided by means of a selective counter-feed-back circuit of a type similar to the one used for the tube T2, whereby it is possible according to a procedure similar to the one described above, to eliminate ground noise and obtain much purer signals. This signal thus stripped of the major portion of its harmonics is amplified through a tube T8 which may be a beam operating pentode or tetrode used as a quite high-powered amplifier (wherein the anode dissipation may be in the order of 9 watts) and is then applied to a transformer TR1 having two secondaries both supplying in in-phase relationship the two anodes of the tube T7 (a dual triode of the type 6N7), whereas the grids of this tube are supplied from T5 with a 180° out-of-phase displacement.

In such conditions, and for a suitable setting of the alternator with respect to the light-modulating means, whenever the signal on one plate of the tube T7 is in phase with the signal reaching the corresponding grid of said tube, the signal reaching the other grid will be in phase opposition with the corresponding plate. In this half-cycle, one of the plates of the tube T7 will be positive with respect to the cathode while the corresponding grid will be at a less negative voltage with respect to the cathode. The tube element under consideration will be made conductive and a difference of potential will appear across the resistance R36 or R41 as the case may be. At this instant, the plate of the other triode element will also be positive with respect to the cathode, but the grid will be at its most negative point and therefore said element will be switched off. There will therefore appear no voltage drop across the resistors R41 or R36 respectively.

If the signal striking the cell is switched 180°, the operation of the tube T7 will be the same as above, with the difference however that that element which previously was on will now be off while the previously switched off element will supply an output. The voltage recovered across R36 or R41 is filtered through the network including resistors R37, R38, R39 and R40 and capacitors C22 and C23; it will be used for biassing two tubes T'2 and T'3 in the plate circuits of which are inserted the windings of a relay R12 so connected as to act in opposition with respect to each other. The relay is thus operated in response to the differences in current through its windings and will control in either one of two directions of rotation, the motor adapted to displace the adjustable photometric device or wedge so as to restore equality between the light signals passing through both optical paths.

The invention is also directed to the new article of manufacture formed by an automatic recording microphotometer provided with a device enabling the carriage supporting the element or area to be measured to be slowed down, as long as the maximum displacement of the registering apparatus used to measure the degree of opacity has not been attained.

Figs. 2a, 2b and 2c diagrammatically illustrate one embodiment of my improved device, selected merely by way of example and having no restrictive influence on the scope of this invention.

It may be seen in those figures that the signal originating from the photo-cell after amplification through the tube T5 energizes through the assembly C17 and R29 the grid of a tube T6 (which preferably will comprise a tube of the triode 6C5 type), which is mounted as a cathode loaded detector. As soon as the signal reaches a sufficient amplitude, it causes an increase in the output of the tube T6 and as a result an increase in the difference of potential across the resistor R32. This voltage increase in turn causes an increase in the output of the tube T'1 the grid of which is connected with the cathode of T6. The relay RL1 is then energized, and the effect of this is to cut off the supply circuit for the motor controlling the displacements of the carriage supporting the element to be measured. The operating threshold of the whole assembly is adjustable through adjustment of the resistor R5 the purpose of which is to determine the amplitude of the electric signal, that is, in fine, the variations in optical density of the area to be measured as corresponding to a stopping of the feed displacement of the carriage. An automatic sensibility control is thus achieved making it possible in each individual case to correlate the recording speed with the optical density of the figure to be examined, and this making it possible to use a maximum recording speed which will automatically be reduced in response to the nature of the area to be scanned so as to obtain a correct measurement.

The device just described is in no wise restrictive of the scope of the invention and it will be an easy matter for those familiar with the art to design yet other circuit combinations making it possible to attain similar results and which are also to be construed as falling within the scope of the invention.

I may mention as a further example the arrangement in which the carriage is set into motion by means of a gas discharge tube having an adjustable operating threshold, and also adjustable threshold devices based on the principle of multivibrators and more generally any device making it possible to initiate an adjustable mechanical action from an electrical signal, which devices may or may not be based on the use of circuits having an appropriate time constant (delay networks).

What I claim as my invention is:

1. In an automatic recording microphotometer of the type described including a single light source and two separate optical paths extending from said source and both terminating in a common photocell, a common electric transmission path from said photocell and two separate output transmission paths fed from said common transmission path, means for continually alternately switching the beam issuing from said light source from one to the other of said optical paths, comprising a light-opaque rotatable cylinder arranged coaxially around said light source and having a plurality of identical and angularly equi-spaced slots formed in the peripherical surface thereof, so arranged with respect to the respective inputs of said optical paths as to uncover said beam to each of said optical paths in alternate succession; means for rotating said cylinder; and means controlled by said uncovering of said beam for alternately blocking each of said output transmission paths in synchronism with said alternate uncovering of said beam.

2. In an apparatus as set forth in claim 1, said cylinder comprising an odd number of said angularly equi-spaced slots, and the respective inputs of said optical paths being in diametrically opposed relationship with respect to said cylinder.

3. In an apparatus as set forth in claim 1, and including one electronic tube in each of said output transmission paths, said tubes being 180° phase shifted with respect to each other, an electric motor driving said cylinder, a multi-pole alternator driven from said motor and having a number of poles correlated with the number of said slots in said cylinder, and means for applying the A. C. output of said alternator to said electronic tubes, thereby alternately blocking each of said output transmission paths in the required synchronism with the uncovering of said beam to each of said optical paths.

4. In an apparatus as set forth in claim 3, said common transmission path comprising a selective electronic amplifier including a negative feed-back network tuned to the frequency of said alternator.

5. An apparatus as claimed in claim 1, wherein said common transmission path comprises a multi-stage amplifier, each stage of which includes an electronic tube, a negative feed-back network tuned to said switching frequency and connected across the control grid and the anode of said electronic tube in one of said amplifying stages, and a pair of symmetrical amplifier tubes forming said separate output paths and fed in 180° out-of-phase relationship from said amplifier across the anode and cathode circuits of said electronic tube in the last stage of said amplifier, and means for grid-biasing said symmetrical tubes to produce a substantially pure square wave form in the output signals therefrom.

6. In an apparatus of the type claimed in claim 1, an electric motor driving said cylinder, a multi-pole alternator driven from said motor having a number of poles correlated with the number of said slots in said cylinder, an electronic amplifying tube fed by the output of said alternator, a selective negative feed-back grid-anode coupling network in said tube, tuned to the basic frequency as determined by said alternator, further amplifying means fed from said tube, a transformer having a primary fed from said last-mentioned amplifying means and two secondaries, an electronic tube in each of said output transmission paths, and means for connecting said secondaries of said transformer to said electronic tubes in each of said output paths respectively to alternately block the same in synchronism with said basic frequency.

7. In an automatic recording microphotometer of the type described and claimed in claim 1 comprising a carriage supporting the element to be analyzed and means including an electric motor to traverse said carriage for scanning said element, means responsive to the variations in opacity throughout said element, comprising a gate electronic tube connected with said common transmission path, means connected with said gate tube for enabling said tube to pass only signals beyond a given threshold amplitude, and an electro-mechanical relay fed by said tube and adapted to cut off the energizing circuit for said electric motor for said carriage.

ETIENNE VASSY.

No references cited.